Nov. 14, 1961 J. B. SHAW ET AL 3,009,053
LAMP ASSEMBLY
Filed March 12, 1959 5 Sheets-Sheet 3

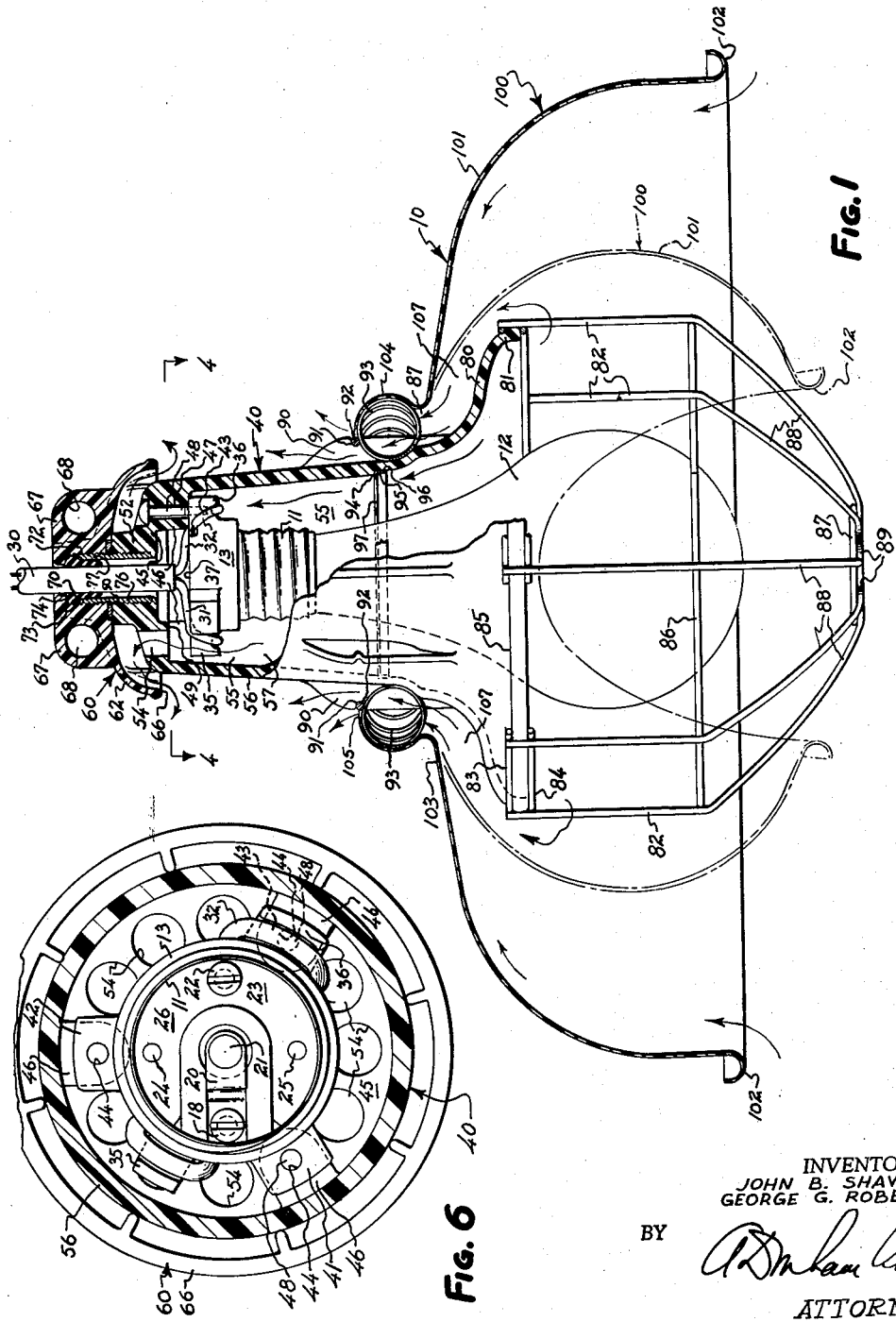

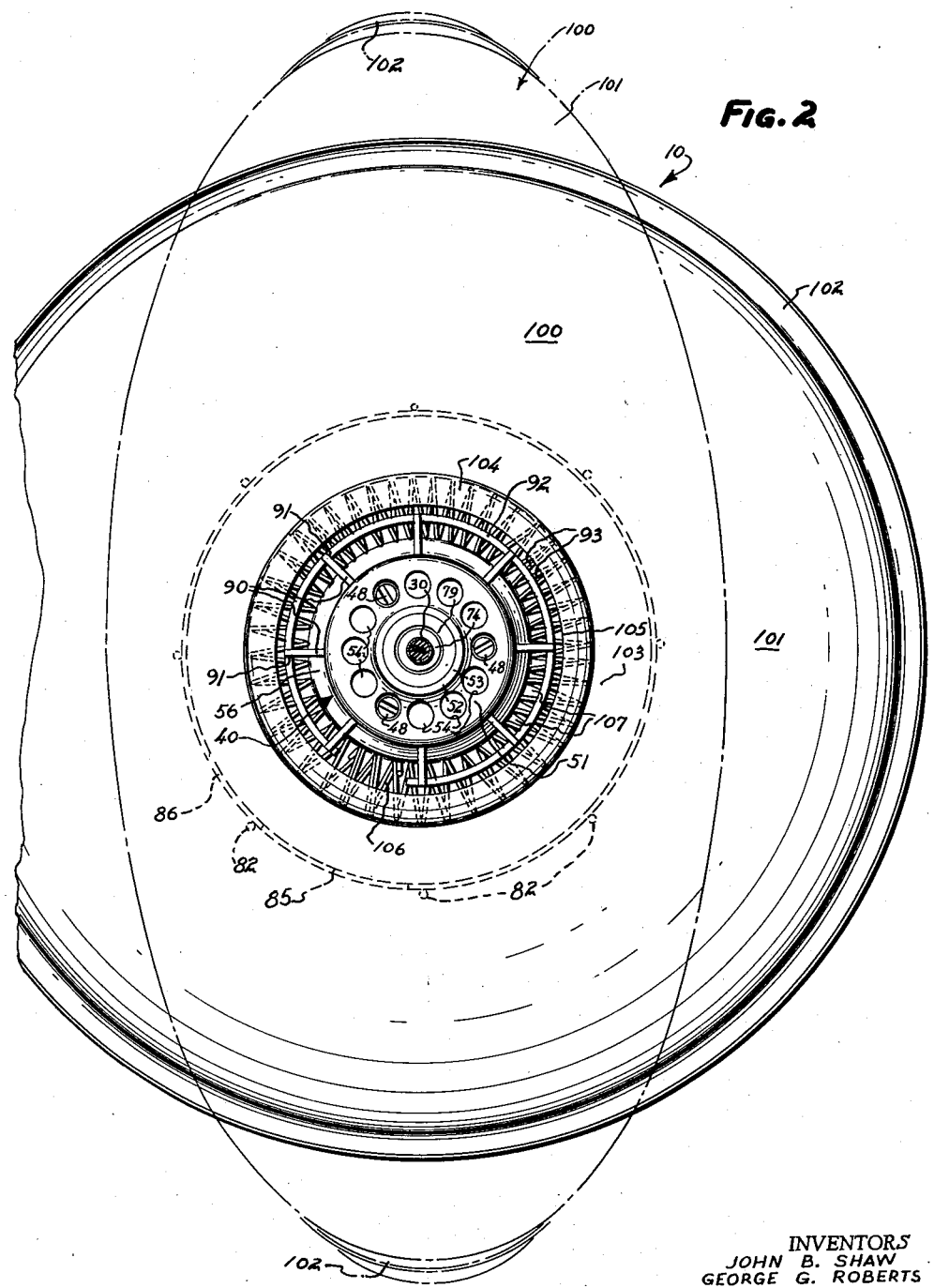

INVENTORS
JOHN B. SHAW
GEORGE G. ROBERTS
BY
ATTORNEY

Nov. 14, 1961  J. B. SHAW ET AL  3,009,053
LAMP ASSEMBLY
Filed March 12, 1959  5 Sheets-Sheet 4

INVENTOR.
JOHN B. SHAW
GEORGE G. ROBERTS
BY
A. Dunham Oren
ATTORNEY

Nov. 14, 1961   J. B. SHAW ET AL   3,009,053
LAMP ASSEMBLY
Filed March 12, 1959   5 Sheets-Sheet 5

INVENTORS
JOHN B. SHAW
GEORGE G. ROBERTS
BY
ATTORNEY

3,009,053
LAMP ASSEMBLY

John B. Shaw, 45 Hudson St., Redwood City, Calif., and George G. Roberts, Redwood City, Calif. (447 Eleanor Drive, Woodside, Calif.)
Filed Mar. 12, 1959, Ser. No. 798,949
17 Claims. (Cl. 240—11.2)

This invention relates to a lamp assembly. It also relates to an improved lamp shade for various uses in connection with an electric light at the end of a cord.

Heretofore, mechanics, ships' crews, and others have been familiar with caged light globes, with and without shades, to give light at various places. For example, large, shaded portable lamps are used in connection with lighting the cargo holds of ships. These holds are often deep wells in ships, and in order to enable those working therein to see what they are doing, especially at night, a lamp at the end of a cord is lowered into the hold. Portable lamps are also used to illuminate gangways at night or to give light to barges working alongside the ship in loading fuel oil or cargo, and for many other purposes.

While the individual parts of the lamp assemblies heretofore in use were usually approved for installation by Underwriters' Laboratories, Inc., and had been tested by them as separate elements, the combination or assembly itself had not been approved and was, in fact, often dangerous. In most cases the assembly was done by ship chandlers using any group of parts they had at hand, and such lights were not even submitted for approval, apparently under the belief that if the parts were individually approved, that was sufficient precaution. Thus, the lamp shade itself might be satisfactory for use in a stationary installation, as in the ceiling of a building, but it was not satisfactory for use at the end of a long cord; as a cargo light it would swing back and forth and strike against the walls, with resultant breakage. The cord, socket, and other parts might be perfectly satisfactory for use in some installations, but the assembly into an end-of-the-cord lamp was a different matter. This invention is particularly directed to a safe assembly. All the lamps heretofore used as cargo lights were extremely objectionable so far as safety is concerned and they had many other undesirable features. The present lamp is approved as an entity by Underwriters' Laboratories, Inc.

One of the prime dangers in cargo lamps and the like has been that they got too hot when they were used. There was no way provided for carrying off the heat as rapidly as it built up. In fact, the socket has conventionally been enclosed in an insulated tube or socket holder of ceramic or hard rubber closed at one end. Heat from the lamp globe tended to rise in the lamp and was carried to the socket, and the insulated tube held in each accretion of heat. Moreover, the heat from the filament was conducted by its wire to the base of the socket and there was no means there to dissipate the heat. Still further, the rubber insulation on the cable was subjected to this heat adjacent where it was attached to the socket holder. The rubber was cooked, dried out, and cracked or powdered and became liable to fall off or check away, making short circuits where the two wires lay closely adjacent. In some cases, asbestos insulation was used rather than trying to carry away the heat that built up. The present invention solves this problem by not enclosing the metal socket tightly in an insulated sheath but instead ventilating it by passage of air all around its sides, between it and an enclosing insulating housing. The heat is carried away, out the top of the lamp assembly.

In the prior art, the lamp assemblies were ventilated entirely from the normally open bottom end. This bottom portion was bounded by the flat rim at the bottom of the shade, often with a metal guard extending flatly thereacross to protect the globe. As a result, when the lamp was placed flat on the floor or on a table, there was no ventilation. The heat generated by the lamp built up inside the shade and some reached dangerous levels—especially with 300 watt bulbs and the like. One could not even seen the light to tell whether it was on or not, because little light escaped between the edge of the shade and the floor or table. The heat that built up inside was a dangerous fire hazard; many fires were prevented only by the fact that the heat sometimes caused the lamp to burn out before it could set fire to what it was resting on. That was scant recommendation for the unventilated shade. Furthermore, if one picked up a hot lamp shade, unaware that the lamp was on, he burned his hand. Even while the lamp was hanging at the bottom of the cord, the lack of through ventilation caused heat to build up inside the lamp and made it very hot to handle.

Consequently, a very important object of the present invention is to provide a safe lamp assembly for use as a cargo light and as a movable lamp.

A corollary object is to provide an adequately ventilated lamp of the type that is put on the end of a long cord for such use as in cargo holds.

A problem which the present invention had to solve in order to achieve these objects was how to ventilate the shade without impairing its value as a shade, without sending light up through it, and without subjecting the globe to rain or dripping water. This problem the invention has solved, and its solution represents another object of the invention. Put another way, one object of the present invention is to keep rain from dropping down on the light globe without restricting the ventilation.

Another danger in prior-art lamps arose from the fact that many of the shades heretofore used were made of porcelainized metal. When these lamps were used as cargo lamps and the cord swung back and forth in the hold and hit something, pieces tended to chip off. The chips sometimes fell on people or cut them or left sharp edges on the lamp shade which cut them when they handled it. The metal exposed by the missing chips was likely to rust and in any event the reflective capacity of the reflector was reduced, so that the lamp gave less illumination. The present invention provides an all-plastic shade construction that does not break and chip.

Another severe problem with such lamp shades was that they usually had a metal base or were even all metal, in order to avoid the chipping and breakage problem. In this event, being unventilated, they became extremely hot. Moreover, if any internal short circuit developed, the metal shade conducted the live electricity to any object that touched it. Lamps have frequently shorted out through such metal shades, the danger then becoming extreme. The all-plastic, non-conducting shade construction of the present invention cannot possibly conduct the electricity to ground, even if an internal short does develop. Even if the outer shade is metal, the inner shade precludes such conduction. Therefore, the safety factor is still further increased.

The rigid metal or porcelain-on-metal lamp shades of the prior art were rigid and could not be inserted through narrow openings. The only way that the lamp as a whole could be passed through a narrow opening, even if it were quite wide in one dimension, was to take the shade off the lamp and re-insert it, and this was usually time consuming and annoying because screws were used for the insertion and attachment. In the present invention a flexible all-plastic outer shade is provided. This shade is sufficiently flexible so that it can be partially collapsed along one dimension and inserted through a narrow opening, so long as the other dimension is wide enough. Moreover, it can easily be detached, brought around, and inserted on the other side of the opening without the degree of inconvenience caused by the reassembly and disassembly of the prior-art lamps, because no screws are needed to attach it in place and on reinsertion it is simply snapped into place. In fact, the inner shade can be used alone and the outer shade omitted, and there will still be excellent illumination, and there will still be ventilation.

The shades can be made opaque or translucent. If translucent, they can be seen more clearly from above, as by a winch operator removing cargo from a hold, and damage to the lamp is more easily avoided.

Another advantage of the lamp of this invention is that the parts are combined without washers, grommets, and other objectionable elements and without a large number of parts that can be lost.

Still another feature is the incorporation of a metal disk that steadies the light globe and prevents it from being knocked out of line, and also prevents fingers from getting into the socket portion where they could lead to electrical shocks when the globe is out.

Furthermore, the assembly of this invention also makes an attractive and efficient fixture, if portability, is not needed.

Other objects and advantages of the invention will appear from the following description of some preferred embodiments thereof.

In the drawings:

FIG. 1 is a view in elevation and partly in section of a lamp embodying the features of the present invention. Broken lines show the flexible outer shade in a compressed position enabling it to be put through an opening that is narrow in one dimension and wide in the other dimension.

FIG. 2 is a top plan view of a lamp assembly of FIG. 1 with the drip shield removed and with a portion of the shade broken off along the left-hand margin. Broken lines again indicate the compressed oval position to which the outer shade may be forced for inserting the lamp through a slit-like opening.

FIG. 6 is a view taken in section along the line 6—6 of FIG. 5, looking up into the socket and its attachment to the inner shade or shell.

Figure 4:
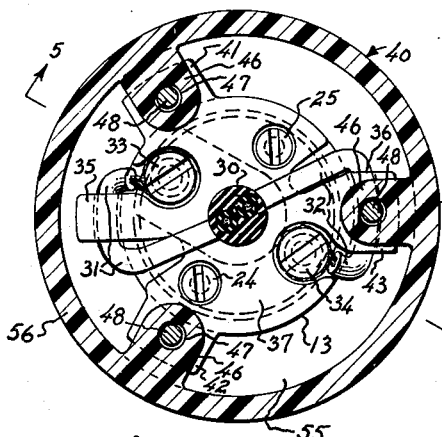
FIG. 4 is a plan view in section taken along the line 4—4 in FIG. 1 but shown on an enlarged scale.

*The lamp assembly 10 of FIGS. 1–6*

The lamp assembly 10 comprises a combination of several novel elements. It also, however, includes and makes possible the use of a very simple, inexpensive, and rudimentary metal socket 11 into which a light globe 12 is screwed. The socket 11 is supported by a novel socket-holder 13 of impact-resistant and electrically-insulating plastic material, such as alkyd-polyester resin. Two openings 14, 15 through the socket-holder or base 13 are provided with internally threaded metal sleeves 16 and 17 (see FIG. 5). A lower screw 18 (FIGS. 5 and 6) threaded into the lower end of the sleeve 16 mechanically secures and electrically connects to the sleeve 16 a base contact-plate 20 having a center contact button 21 and backed up by a compression-spring 20$^a$ in a depression 20$^b$. A lower screw 22 is threaded into the bottom of the metal sleeve 17 and connects it electrically and mechanically to a bottom portion 23 of the metal socket 11. The socket-bottom 23 is also held in place by screws 24 and 25, that extend down through the socket-holder 13 and are secured to the socket-bottom 23 by a tapped plate 26 of generally horseshoe shape through which the screw 22 also extends.

Figure 5:
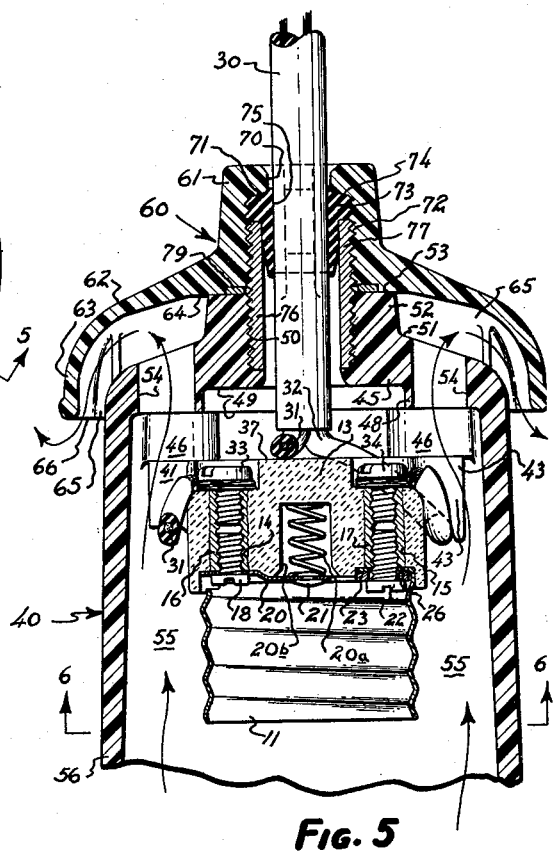
FIG. 5 is an enlarged fragmentary view in elevation and in section of the upper portion of the lamp, taken along the line 5—5 in FIG. 4.
Figure 3:
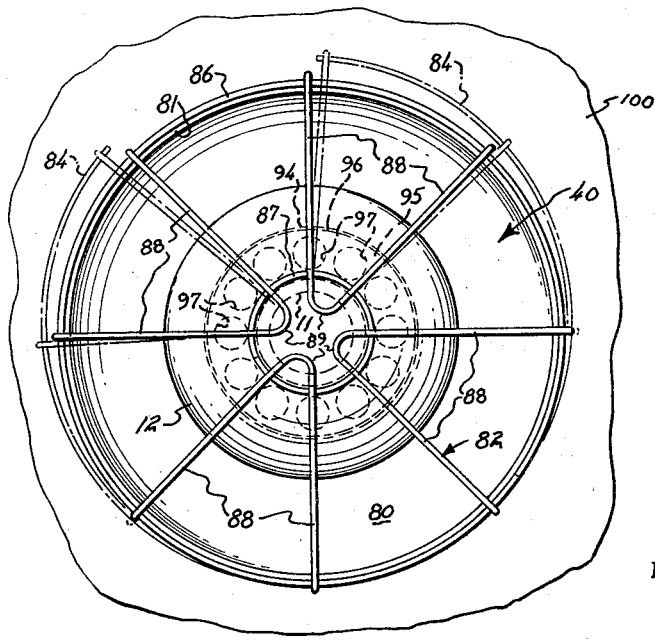
FIG. 3 is a fragmentary bottom-plan view of the wire cage and the lamp, with most of the outer shade broken away.
Figure 9:
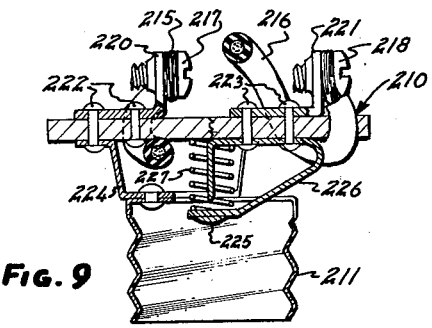
FIG. 9 is a view in elevation and in section of the socket support, taken along the line 9—9 of FIG. 8.
Figure 8:
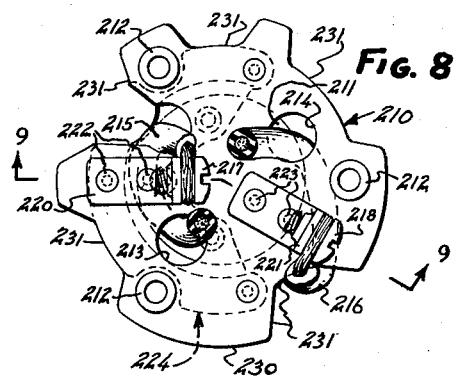
FIG. 8 is a top plan view of the socket-holding assembly shown on an enlarged scale with respect to FIG. 7.
Figure 10:
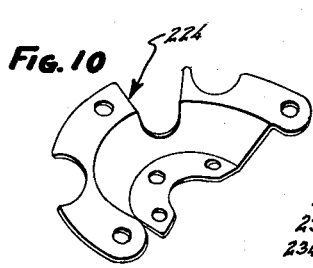
FIG. 10 is a view in perspective of the socket-supporting plate.

A cable 30 has its wires 31 and 32 electrically connected to the metal sleeves 16 and 17 by upper screws 33 and 34 (FIGS. 4 and 5). The socket-holder 13 is molded to provide an integral pair of generally L-shaped projections 35 and 36 that extend out radially from the upper end 37 of the holder 13 and then extend axially downwardly. These projections 35, 36 are used for protecting the wires 31 and 32 against pull, by winding them once around the projection before they are secured to the screws 33 and 34.

The socket holder 13 is secured at its upper end 37 to a shell or inner shade member 40. For this purpose, the socket-holder 13 is provided with three ears 41, 42, and 43, the ear 43 coinciding with the projection 36. Each of these ears has a threaded opening 44.

The shell 40, which is molded from strong plastic material like that of the socket 13 or may be made from laminated polyester resin with glass-fiber reinforcement, has a generally radially extending upper end 45 from which depend three projections 46, each having an opening 47 therethrough. The openings 47 are aligned with the threaded openings 44 of the ears 41, 42, and 43, and through these openings screws 48 are inserted; they engage the threaded openings 44 and thereby secure the novel plastic socket-holder 13 to the novel plastic shell 40. It will be noted that the projections 46 space the top 37 of the socket holder away from the bottom surfaces 49 of the shell portion 45.

The top generally radial portion 45 of the shell 40 is provided with an internally threaded central opening 50. The upper surface 51 of the central portion 45 is rounded and slopes upwardly and terminates in a central axial portion 52 with an upper end surface 53 (FIG. 5).

A very important feature of the invention is the provision of an annular series of axially extending ventilating openings 54 around the central opening 50 (see FIGS. 2, 5 and 6). The bolt-openings 47 may be arranged in the same annular series as the ventilation-openings 54 in order to conserve space. However, the openings 54 are considerably larger than the openings 47 and their purpose is to provide a series of ventilating channels leading from the interior 55 of the shell 40 to its exterior. Thus, it will be seen that the spacing-lugs 46 keep the openings 54 spaced from the socket 11 and socket-holder 13 so that air heated by the globe 12 passes up through the interior passage 55 and through the ventilating openings 54. The passage 55 is defined by a gradually flaring but near-cylindrical axial portion 56 of the shell 40 that encircles the socket 11 and socket-holder 13 and is spaced radially outwardly from them a sufficient distance to provide the ventilating space or passage 55.

To protect the globe 12 from rain or other water that might drop down through the ventilating openings 54, a drip-shield 60 is provided (FIGS. 1 and 5). The drip-shield 60 comprises an annular shell with an axially extending portion 61 and a generally radial shield portion 62 with an axially downwardly extending lip 63. The shield's radially inner and lower surface 64 abuts the upper end 53 of the axial portion 52 of the shell 40 and the drip-shield 60 is thereby spaced from the upper surface 51 of the shell 40. Furthermore, the drip-shield 60 extends wide of the axial portion 56 and provides a channel 65 for the passage of air from openings 54 into the atmosphere, flowing radially outwardly and then downwardly and outwardly to a point below the lower rim 66 of the drip-shield 60 which, as will be noted, lies a substantial distance below the upper end of the openings 54 and, in fact, preferably even lies below the lower end of these openings 54. The essential point is that the simple maze-like passage 65 does not impede the flow of hot air while dripping water is unable to enter. In fact, no matter what direction water comes from, it has to traverse a maze before it can enter into the interior 55 of the lamp; therefore the globe 12 is always protected from the entry of water in the atmosphere.

The drip-shield 60 is molded from a heavy, strong plastic, preferably the same kind as that used for the socket 13 and the shell 40, such as phenolic resin. Its axial portion 61 is shaped to provide a lashing projection 67 (FIG. 1) which extends out on diametrically opposite sides and is provided with openings 68 by which ropes, wires, or other lashing means can be used to secure the lamp to any structure desired for a temporary support without pulling directly on the cord 30.

The drip-shield 60 has a central opening 70 for the cord 30, with a shoulder 71 at its upper end and a threaded portion 72 therebelow (FIG. 5). Engaging against the shoulder 71 is a rubber or neoprene seal and cord-gripping member 73 which has a wide portion 74 at its upper end. The cord-gripping member 73 has a central opening 75 normally smaller than the outside of the cord 30 and stretched open by the cord 30 so that it grips it very tightly. It is held in place against the shoulder 71 by a metal nipple 76 which has an exteriorly threaded upper end 77 that engages the threaded portion 72 of the drip-shield 60. The nipple 76 also has an externally threaded lower end 78 that engages the threaded opening 50 of the shell 40. A lock-washer 79 is located at the juncture of the drip-shield 60, the metal nipple 76, and the shell 40. The seal 73 also acts as a gasket to keep water from leaking into the fixture along the cord 30.

Thus it will be seen that the cable 30 is protected against pull-out by the friction grip of the rubber seal 73, as well as by the lashing effect of its wires 31 and 32 on the projections 35 and 36. It will also be seen that the drip-shield 60 and rubber seal 73 protect the interior of the shell 40 from dripping water and also provide a secure lashing means 67 with openings 68, and that the metal nipple 76 secures shield 60 and shell 40 together.

The lower end of the shell 40 is flared outwardly to provide an inner shade portion 80 with a rim 81. A metal guard 82 is secured to the rim 81 and extends around the lamp globe 12 to protect it from breakage. The metal cage 82 comprises a pair of stout and fairly springy arcuate-shaped wires 83 and 84 which extend for about ⅞ of a circle, leaving an open segment a few inches wide between their ends. This provides a means for spreading the wires 83 and 84 apart enough to enable their insertion on and removal from the rim 81. When in place, the wire 83 lies along a short shoulder 85 that defines the upper end of the rim 81, and the wire 84 lies below the flat lower surface of the rim 81. Thus the bead-like rim holds the wire guard 82 in place.

Spaced down from the arcuate portions 83, 84 is a circular wire portion 86 and at the lower end of the guard 82 is a much smaller circular wire portion 87. The wire portion 86 is a closed loop and controls the spring-like action of the interrupted loops 83 and 84. Connecting the wires 83, 84, 86, and 87 are a series of wires 88 bent at their lower ends 89 inside the circle 87 and extending upwardly and outwardly. The lamp-guard 82 may be made of non-ferrous, non-sparking material, and the fact that it snaps on without bolts is one of its outstanding features.

The shell 40 is also provided with a series of axially extending ribs 90 that project radially out from its outer surface and extend from the portion 56 to the upper portion of the inner shade 80. These ribs 90 may extend about a half-inch outwardly and are relatively narrow but rather stiff. They are each provided with a notch 91, all the notches 91 lying in substantially the same plane to receive a locking-wire 92 that helps to hold an open-wound helical coil of wire 93 in place, for a reason that will soon become apparent.

To afford additional protection for the globe 12 and to prevent people from sticking their fingers into the socket 11 when there is no globe and thereby getting an electrical shock, the shell 40 may be provided with an annular shoulder 94 in which fits a plate-like metal guard 95 with a rim 96 that extends downwardly. The guard 95 is provided with a series of ventilating openings 97 (see FIGS. 1 and 3).

The socket-holder 13, shell 40, and drip-shield 60 all are made of stout, heavy, rather stiff, impact-resistant plastic. The invention also includes, however, an outer shade 100 made of a substantially thinner, flexible plastic, such as polyester resin reinforced by glass fibers or some slow-burning thermoplastic material. This outer shade 100 comprises a bowl portion 101 with a turned-up outer rim 102 that helps to impart stability, strength, and also support when the lamp assembly rests on the rim 102. The bowl 101 may be opaque, translucent, or transparent, as desired. If light can pass through the bowl 101, it can be seen from above and is less likely to be damaged. The shade 100 also has a substantially horizontal upper portion 103 above which it is shaped to provide a channel 104 that terminates in a radially inwardly extending rim 105. The channel 104 is attached to the shell 40 by the open-wound wire coil 93. The coil 93 is attached to itself by three or so close-wound turns 106. The coil 93 fits inside the channel 104 and also fits around and is held in place by the ribs 90 and outer surface of the shell 40. When the outer shade 100 is lowered from the top, with the coil 93 in its channel 104, it is brought down over the shell 40. Then, when the coil 93 engages the ribs 90, the stiff metal wire 92 is slipped over the ribs 90 from the top, slides down on the rounded upper portion of the rib 90, and then is locked into the notches 91, thereby securing the open-wound coil 93 in place. It will be noted that the coil 93, together with the dimensional configuration of the shell 40 and the outer shade 100, provides an inner channel 107 between the outer shade 100 and the inner shade 80 for further ventilation; thus hot air can pass up through the channel 107 and between the coils of the spring 93 and then to the atmosphere. The spring 93 also serves as a shock absorber that protects the light globe 12 from shock when the outer shade 100 is struck, usually at its outer rim 102; thereby, it increases the life of the expensive light-globe 12, which preferably is of the Mogul-base type.

It will be noted that the lower portion of the wire guard 82 extends a substantial distance below the rim 102 of the outer shade 100, so that when the guard 82 is in place the lamp assembly can never be placed flat on the floor. It will always be on one side and therefore will always afford complete ventilation. However, even should the guard 82 be removed and the rim 102 be placed flush on the floor, there will still be ventilation through the two ventilating systems that have been described. It will also be seen from FIGS. 1 and 2 that the outer shade 100 can be pushed together and forward for inserting the lamp through a rectangular opening having one narrow and one wide dimension. This is particularly useful in ships where such openings are frequent.

In assembly, the socket 11 may be assembled to its socket holder 13 by the screws 22, 24, and 25, and the contact plate 20 is assembled to the socket holder 13 by the screw 18. The outer shade 100, drip shield 60, rubber guard 70, metal neck 76, lock washer 79, and shell 40 are slipped up the cord in that order. The socket holder 13 may then be attached to the wires 31 and 32 of the cord 30, care being taken to lash the wires 31 and 32 around the projections 35 and 36 to give them support. Insulation need be removed from the inner wires 31 and 32 only where they contact the screws 33 and 34 and the metal conducting sleeves 16 and 17. The inner shell 40 is then brought down and secured to the socket holder 13 by the screws 48, the spacing lugs 46 spacing the bottom 49 of the shell from the top 37 of the socket holder 13. Next, the nipple 76 is threaded into the opening 50 of the shell 40. The cord-gripping rubber sleeve 70 is inserted into the drip shield 60 against the shoulder 71 and then drip shield 60 is threaded around the upper end of the metal nipple 76, with the lock washer 79 in place. Then the outer shade 100 with its wire coil 93 in place is brought down around the shell 40 and the inner shade 80 with the coil fitting around the ribs 90 provided therefor. Then the snap ring 92 is locked into place in the notches 91, securing the inner and outer shades together. The metal guard 95 may be slipped into place, the globe 12 added, and then the metal cage 82 may be spread slightly and snapped around the rim 80. The lamp assembly is now complete.

In operation, the lamp may be supported by lashing cords passed through the holes 68 in the drip shield assembly 60 at any desired location, the lamp being supported both by the gripping rubber sleeve 70 and the lashing cords, not by the wires 31 and 32, so that they are not directly pulled upon, to the damage of the lamp. For passing through narrow openings, the outer shade 100 may be pushed together or, if needed, the outer shade 100 may be taken off temporarily or even permanently, for its absence does not impair the remaining assembly's ability to serve as a portable lamp for many uses. In either event, the heat generated by the light-globe 12 is dissipated by flowing up inside the upper shade 80, through the passage 55, the openings 54, and the channel 65 between the shell 40 and the drip-shield 60. In addition, ventilation is obtained around the inner shade 80, between it and the outer shade 100, through the channel 107, and through the coil 93 into the atmosphere. The upper end 105 of the outer shade 100 and the drip-shield 60 provide drip protection by providing a maze through which water cannot readily get at the globe 12, and the inner shade 80 also helps in this regard.

As implied above, the lamp assembly 10 can be used as a permanent fixture and makes a very good one. In this event, if installed indoors, the drip-shield 60 may be removed and the nipple 76 replaced by the threaded end of a pipe installed in the ceiling in a conventional manner. When threaded into the shell 40, the pipe will support the lamp. (Compare FIG. 15.)

The assembly 10 may use a 300-watt Mogul-base lamp-globe 12 at rated lamp wattage in the normal position and will not overheat. A typical lamp assembly 10 had a reinforced polyester shell 40 about ⅛ inch thick, 8 inches in diameter at its base, and 6⅞ inches high. The ribs 90 were about ¼ inch thick and 2 inches high, and were spaced about 1¾ inches apart. Nine holes 54, about ⅜ inch in diameter, were used for ventilation. The lower shade 100 was slow-burning thermoplastic, 16 inches in diameter at the bottom, excluding the rim thickness, 6 inches high, and the opening at its upper end was about 5¼ inches (across the rim 105). The guard 82 was made from ⅛ inch plated steel wire. The drip-shield 60 was made from a polyester resin and was about 3⅞ inches in diameter by about 1¹⁵⁄₁₆ inches high. Its entrance-hole 70 was about ⁷⁄₁₆ inch in diameter, and its tapped, threaded opening 72 about ¾ inch deep. Its projection 67 provided openings about ⁹⁄₁₆ inch in diameter. The bushing or cord-gripping member 73 was neoprene, about ½ inch long and ¾ inch in diameter, and fitted snugly around type-S or ST cord 30. The nipple 76 was about 1⅛ inch long. The coil 93 was ¹⁄₁₆ inch wire with a coil diameter of about one inch. The lampholder-guard 95 was used. The naked metal socket 11 was held by a holder 13 of molded phenolic, approximately 1¹³⁄₁₆ inch in diameter, not counting its lugs, and about one inch high. Conventional brass or copper screws and brass or copper shells for the screws were used.

A sample lamp assembly 10 was given a rain test by mounting it in the normal position and subjecting it for one hour to a 45° downward water-spray adjusted to simulate a beating rain. Following this test, the exterior surfaces were wiped dry and the interior in the vicinity of electrical components was examined for the presence of moisture. There was no indication of moisture in the vicinity of the lampholder terminal screws 18, 22, 33 and 34, or in the vicinity of the interior of the screw-shell 11.

The same sample was given a strain-relief test, in which the conductors 31 and 32 were disconnected from the lampholder terminal screws 33 and 34 and the supply-cord 30 was subjected to a 35-lb. pull directed normal to the plane of the cord entrance-hole, for a period of one minute. The compression-bushing resisted the applied force, and there was no indication of movement of the ends of the conductors 31 and 32.

*The modification shown in FIGS. 7–11*

A somewhat simplified lamp 200 is shown in FIGS. 7 through 11. This lamp 200 may be used where a simplified and less expensive structure is suitable. It includes a generally axial shell 201, which may be made from metal or, for uses where metal is unsuitable, may be made of plastic, as in FIGS. 1 through 6. The shell 201, as illustrated, is shown as tapering inwardly somewhat toward an upper end 202, which is provided with ventilation openings 203 and a central threaded axial opening 204. Depending from the end 202 inside the shell 201 are a series of spacing portions 205, each having a stepped opening 206 for the reception of screws 207 that hold an insulating disc 210 which supports the socket 211.

The disc 210 (see FIGS. 8 and 9 especially) is a sheet-like member of a suitable insulating material—for example, a melamine laminate—with upwardly extending spacing projections 212. The disc 210 is made with holes 213 and 214, through which the terminal lead-wires 215 and 216 are passed so as to hold them in against pull. The actual ends of the lead-wires 215 and 216 are fastened by screws 217, 218 to metal terminal-brackets 220, 221 which, in turn, are secured by electrically-conductive rivets 222, 223 to the insulating disc 210.

The socket 211 may be supported by a bracket 224 (FIG. 10) which is riveted to the disc 210 by these rivets, one of the rivets being a conducting-rivet 222 which electrically connects the socket 211 to the terminal 220. A center electrical contact 225 is on a bracket 226 secured to the disc 210 by the rivets 223, which also electrically connect it with the other terminal 221. A suitable spring 227 may be used to assure contact.

By means of the spacers 205 and 212 the disc 210 is spaced down from the end wall 202 of the shell 201, except at the spacers, and the screws 207 are insulated by the plastic material of the disc 210. Moreover, the outer periphery 230 of the disc 210 is spaced from the shell 201 so as to provide adequate ventilation passages, the periphery 230 being cut away at intervals to provide increased ventilation space at indentations 231. The spacing here also helps to prevent electrical contact.

The shell 201 is preferably threaded to the lower end of a nipple 232 which extends up out of the shell 201 and may be made from metal such as steel. Drip protection may be afforded by a shield 233, which may be a steel stamping or a molded part, having a spring-steel ring 234 in its rim 235 and an inner upturned end 236 that surrounds a central portion of the steel nipple 232. A cap 240 is threaded on the upper end of the nipple 232 and holds the drip-shield 233 in place. The cap 240 may be metal or plastic or other suitable material. Preferably, the cap 240 has a hexagonal grip-portion 241, and it also helps to hold in place a sleeve-tubing 242, preferably of nylon, with spun ends 243, 244, and a sealing-washer 245 which prevents leakage down along the wire cord 247. An O-ring 246 is compressed between the drip-shield 233 and the cap 240.

Heat from the light-globe 250 can pass up through a passage 251 between the socket 211 and the shell 201, through the openings 203, and to the atmosphere via a passage 252 between the shell 201 and the drip-shield 233, leaving below the level of the opening 203.

The lower end of the shell 201 may provide an inner shade 255 that flares out, and this shade 255 may be provided with a guard 256 which may be like the guard 82. A plurality of narrow ribs 257 extends axially along the shell 201 and radially outwardly therefrom. For example, there may be sixteen such ribs 257. In lieu of the spring-coil attachment previously illustrated, an outer shade 260 may be interference-fitted on the ribs 257 or may be cemented to the ribs 257 (or even soldered, if metal), leaving ventilating passages 261 between the ribs 257. The outer shade 260 preferably has a turned-up annular inner end 262 and flares out to a lower lip 263. It may be plastic, as before, or may be metal. Thus, the alternative design shown in FIGS. 7 through 11 provides a simplified lamp having many of the advantages of the lamp of FIGS. 1 through 6 and much less expensive.

*Location of ventilation openings (FIG. 11)*

Figures 7, 11, 15:
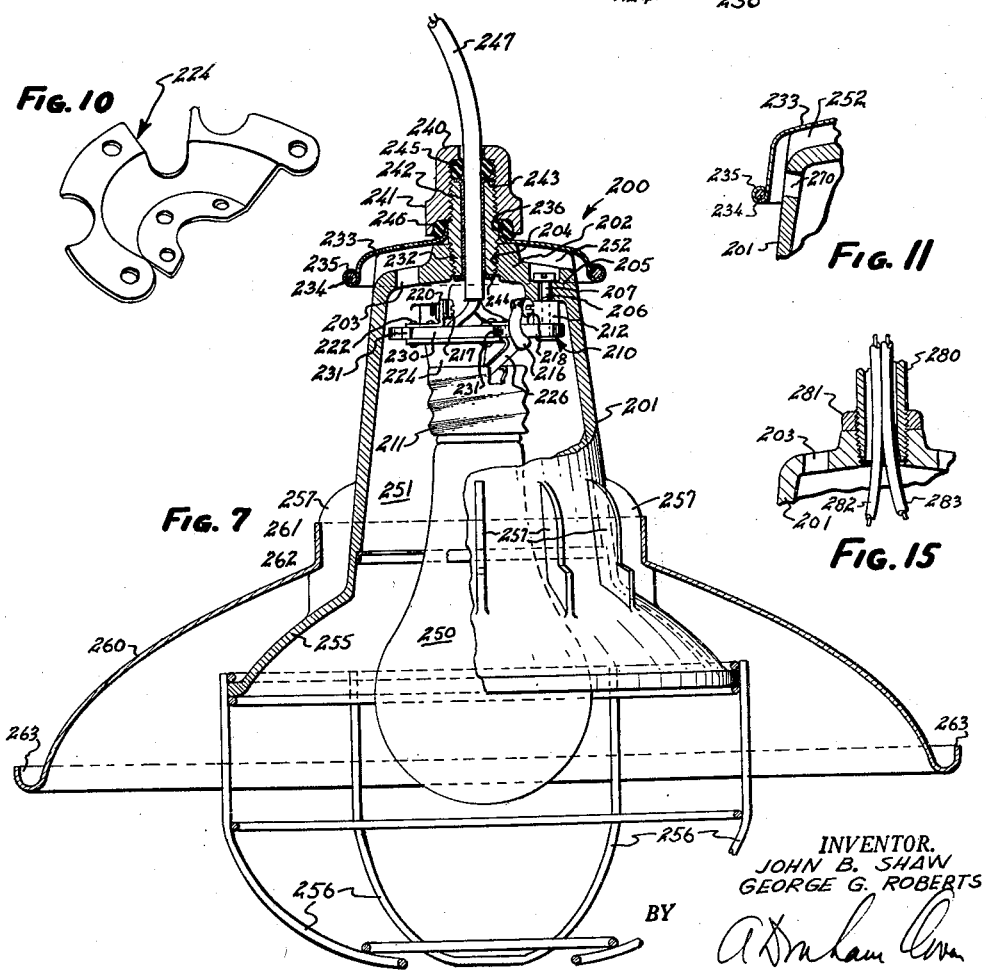
FIG. 7 is a view in elevation and partly in section of a modified form of lamp also embodying the principles of the invention.
FIG. 11 is a fragmentary view in elevation and in section of a portion of a shell, showing a slightly different disposition of ventilating openings.
FIG. 15 is a view similar to FIG. 11 of a modified form thereof, suitable for use as a ceiling fixture.

As FIG. 11 illustrates, the ventilating openings at the upper end of the shell 201 may be axial openings 270 or may be located at the corners. When the term "end" is used, it is not meant to include solely the radial end wall but also the axial wall thereadjoining.

Figure 12:
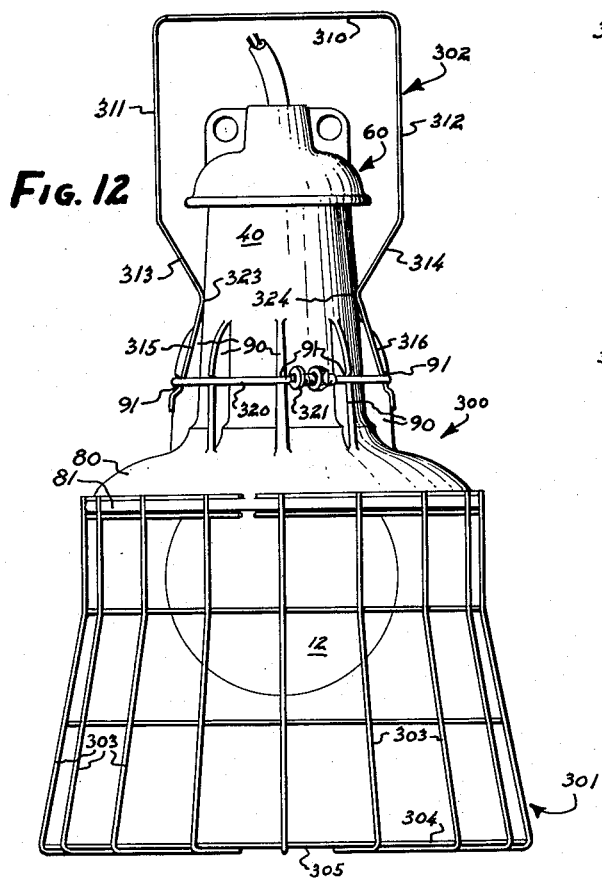
FIG. 12 is a view in elevation of another modified form of lamp embodying the principles of the invention.
Figure 14:
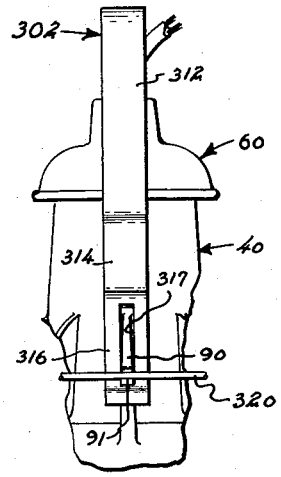
FIG. 14 is a fragmentary view in elevation, taken at 90° from FIG. 12.
Figure 13:
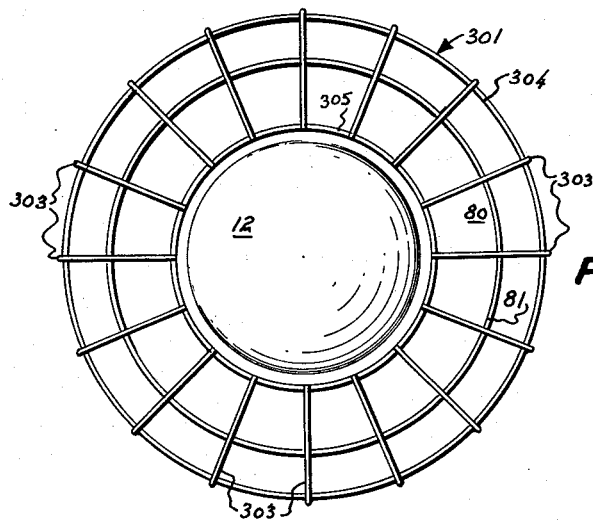
FIG. 13 is a bottom-plan view of the lamp of FIG. 12.

*The lamp of FIGS 12–14*

Another modified form of lamp 300 is shown in FIGS. 12–14. This lamp 300 employs the shell 40 and inner shade 80 of the device of FIGS. 1–6, as well as the drip-shield 60. The socket-holder, etc., are the same, but there is no outer shade, there is a different metal guard 301, and there is a special handle 302.

The lamp 300 may be called a portable hand-light; it may also be used as a tool light, or wherever such illumination is needed.

The guard 301 is made of wire like the guard 82, and like it is secured to the rim 81 of the inner shade 80 by its own spring action. Unlike it, it flares outwardly from the upper to the lower end, at wires 303, and has a flat bottom-end 304; so the lamp 300 can stand on the ground or on a table, resting on the guard-bottom 304, and it will not readily fall over. Moreover, the bottom end 304 has a hole 305 in it, big enough to permit taking out the bulb 12 and putting a new one in without taking off the guard 301.

The handle 302 is made from a strip of spring metal, which may be covered by insulating material, if desired, and has a horizontal upper end portion 310 above the drip-shield 60, vertical sides 311 and 312, inwardly bent portions 313 and 314, and outwardly flared but inwardly sprung end portions 315 and 316, having slots 317 therethrough. The slots 317 enable insertion over a rib 90. Then a locking-wire 320 is inserted over it into the grooves 91 and secured together by a nut and bolt-assembly 321, or any other securing device. The handle 302 is thus held in place securely. Its inwardly-bent portions 313 and 314, bear at 323 and 324 on the shell 40 and afford a secure grasp.

*The modification of FIG. 15*

As stated earlier, the lamp of this invention is suitable for ceiling installation as a permanent fixture. FIG. 15 shows the shell 201, with the ventilating opening 203, secured to the lower end of a conduit 280, with a locknut 281 in place. Two wires 282 and 283 extend through the conduit 280. The drip shield is omitted, along with other related parts, but the lower end of the lamp is the same, with or without the outer shade 260, except that normally, but not always, the wire guard is also omitted.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A lamp assembly, including in combination: a light-globe socket; a socket-holder of sturdy insulating plastic secured to said socket; a one-piece shell of sturdy insulating plastic having a sleeve-like portion with an upper end wall having a plurality of projections secured to the upper end of said socket-holder and an outwardly-flared inner shade at the lower end, said end wall having a central axial opening, said shell having a plurality of vent openings arranged around and spaced from said central opening, said socket-holder being spaced from said shell except at said projections; a perforate metal disk for surrounding the light globe, supported in said shell above said inner shade and below said socket; an outer shade surrounding the lower portion of said inner shade and spaced radially outwardly therefrom, said outer shade having a flexible plastic body with an inner and upper portion around and radially spaced out from said shell and a bowl extending axially below and radially outwardly beyond said inner shade; and means for joining said inner and outer shades while affording ventilation between them for the full height of said outer shade.

2. A lamp, including in combination: a socket; an insulated socket holder supporting said socket; an insulating shell having a sleeve-like portion spaced from and joined to said socket holder and an outwardly-flared inner shade, and an upper end wall having a plurality of axial vent openings, the outer surface of said sleeve-like portion of said shell having a series of radially outwardly extending ribs; a drip shield joined to the upper end wall of said shell with an outwardly extending lip spaced from said shell and extending below the upper end of said shell to protect the interior of the lamp from water dripping through said axial vent openings without interfering with the venting function; an outer insulated shade surrounding said inner shade and spaced outwardly therefrom at all points, said outer shade having a flexible body with a channel-defining portion spaced from said ribs; and a very open wire coil in said channel and engaging said ribs and thereby joining said inner and outer shades while affording ventilation between them through adjacent coils, so that air passing into the lower end of said outer shade can pass up and out through said wire coil into the air around said sleeve-like portion, and air passing into said inner shade can pass up around said socket and socket holder and out through said vent openings and between said shell and said drip shield.

3. A lamp, including in combination: a light-globe socket; a socket holder of sturdy insulating plastic secured to said socket; a one-piece shell of sturdy insulating plastic having a sleeve-like portion with an annular upper end wall secured to the upper end of said socket holder and an outwardly-flared inner shade at the lower end, said end wall having a central axial opening and a plurality of axial vent openings arranged around and spaced from said central opening and means integral with said wall for spacing said socket holder from the remainder of said shell, the outer surface of said sleeve-like portion having a series of radially outwardly extending ribs; an outer shade surrounding the lower portion of said inner shade and spaced radially outwardly therefrom, said outer shade having a flexible translucent plastic body with a channel-defining portion around and radially spaced out from said ribs and a bowl extending axially below and radially outwardly beyond said inner shade; securing, spacing, and ventilating means in said channel for engaging said ribs and thereby joining said inner and outer shades and for affording ventilation between them and around said shell; a globe-protecting cage secured to the rim of said inner shade and extending axially beyond the bowl of said outer shade; a drip shield secured to the upper end of said shell end wall with a lip overlying said end wall and curved down below said end wall at a spaced distance therebetween to protect the interior of the lamp from water dripping through said axial vent openings without interfering with the venting function, said drip shield having projections with lashing openings therethrough.

4. In a lamp, the combination of: a shell of sturdy insulating plastic having a sleeve-like portion with an outwardly-flared inner shade at the lower end, the outer surface of said sleeve-like portion having a series of radially outwardly extending ribs; an outer shade surrounding the lower portion of said inner shade and spaced radially outwardly therefrom, said outer shade having a flexible plastic body with a channel-defining portion around and radially spaced out from said ribs and a bowl extending axially below and radially outwardly beyond said inner shade; and an open wound helical coil of wire in said channel for engaging said ribs and thereby joining said inner and outer shades and for affording ventilation between them through adjacent coils.

5. A cargo lamp, including in combination: a metal light-globe socket; a socket holder of sturdy insulating plastic supporting the upper end of said socket; a cord having a pair of wires connected to said socket through said socket holder; a shell of sturdy insulating plastic having a sleeve-like portion with an annular upper end wall above said socket holder and an outwardly-flared inner shade at the lower end, said end wall having a central axial opening and a plurality of axial vent openings arranged around and spaced from said central opening and a plurality of projections abutting said socket holder and spacing it from the remainder of said shell, the outer surface of said sleeve-like portion having a series of radially outwardly extending ribs joined to the outer side of said inner shade, said ribs having coplanar notches therein near their upper end, the inner surface of said sleeve-like portion being spaced radially outwardly from said socket and said socket holder; means joining said socket holder to said projections; an outer shade surrounding the lower portion of said inner shade and spaced radially outwardly therefrom, said outer shade having a flexible translucent plastic body with a channel-defining portion around and radially spaced out from said ribs and a bowl extending axially below and radially outwardly beyond said inner shade; a very open wire coil in said channel and engaging said ribs and thereby joining said inner and outer shades while affording ventilation between them through adjacent coils; a locking wire in said notches above and engaging said wire coil and holding it relative to said inner shade; a globe-protecting cage secured to the rim of said inner shade and extending axially beyond the bowl of said outer shade; a drip shield axially above said shell end wall with a lip overlying said end wall and curved down below said end wall at a spaced distance therebetween to protect the interior of the lamp from water dripping through said axial vent openings without interfering with the venting function, said drip shield having projections with lashing openings therethrough; means locking said drip shield to said cord; and means securing said shell to said drip shield.

6. A lamp assembly, including in combination: a light-globe socket; a socket-holding plate of sturdy insulating plastic secured to said socket; a shell of sturdy insulating plastic having a sleeve-like portion with an annular upper end-wall secured to the upper end of said socket-holder and an outwardly-flared inner shade at the lower end, said end-wall having a central axial opening and a plurality of vent openings arranged around and spaced from said central opening and means integral with said end wall for spacing said socket-holder from the remainder of said shell, said sleeve-like portion having a circumferential series of outwardly-projecting ribs adjacent said inner shade; an outer shade surrounding the lower portion of said inner shade and spaced radially outwardly therefrom by said ribs and secured to said ribs to provide ventilation passages between said ribs and around said shell.

7. A lamp, including in combination: a socket; an insulated socket-holder supporting said socket; an insulating shell spaced outwardly around said socket and having a sleeve-like portion spaced from and joined to said socket-holder, an outwardly-flared inner shade, and an end portion adjacent said socket-holder having a plurality of vent openings, and a series of outwardly-extending ribs at the junction of said sleeve-like portion and said inner shade; a drip-shield joined to and spaced from said shell with a lip extending below the upper end of said shell; and an outer shade surrounding said inner shade and secured to said ribs in outwardly-spaced relation from said inner shade and said sleeve-like portion to provide ventilation passages between said ribs and said inner shade and around the outside of said shell.

8. A lamp, including in combination: a tubular socket having a base; an insulated socket-holder supporting said socket-base and exposing the rest of said socket; an insulating shell spaced radially away from said socket and having a sleeve-like portion spaced from and joined to said socket-holder and an outwardly-flared shade portion distant therefrom, and an end adjacent said socket-holder having a plurality of vent openings; and a wire guard secured to said shade portion and flaring outwardly to a flat end below said shade portion.

9. A lamp, including in combination: a socket; an insulated socket-holder supporting said socket; an insulating shell spaced outwardly around said socket and having a sleeve-like portion spaced from and joined to said socket-holder, an outwardly-flared shade, and an end portion adjacent said socket-holder having a plurality of vent openings, and a series of outwardly-extending ribs at the junction of said sleeve-like portion and said shade, with a circumferential series of grooves in said ribs; a drip-shield joined to and spaced from said shell with a lip extending below the upper end of said shell; a handle comprising a strip of stiff material bent to provide a handle portion above said drip shield and having a pair of arms extending down to said ribs and slotted to receive a rib each therethrough; and a lock wire in said groove overlying and locking said handle to said shell.

10. The device of claim 9 having a wire guard secured to the lower end of said shade and extending down vertically therefrom and terminating in a flat end that can rest on the floor, said wire guard flaring outwardly from its upper end to its lower end to make its flat end a more stable base.

11. A lamp assembly, including in combination: a light-globe socket; a socket-holder of sturdy insulating material secured to said socket; a one-piece shell of sturdy insulating material having a sleeve-like portion with an upper end wall secured to the upper end of said socket-holder and an outwardly-flared inner shade at the lower end, said end wall having a central axial opening, said shell having a plurality of vent openings arranged around and spaced from said central opening, said socket-holder being spaced from said shell except at said projections; perforate finger guard means for surrounding the light globe, supported in said shell above said inner shade and below said socket; an outer shade surrounding the lower portion of said inner shade and spaced radially outwardly therefrom; and means for joining said inner and outer shades while affording ventilation between them.

12. A lamp assembly, including in combination a one-piece lamp housing of insulating material flared toward an open bottom end to provide an integral lampshade portion and having an end wall at the top with a central axial opening therethrough and having circumferentially spaced ventilating apertures disposed around said opening; an insulated socket holder secured to said end wall with its periphery spaced in radially from the walls of said housing; an insulated conducting cord; means attaching said socket holder directly to said cord for support of the entire lamp assembly by said cord; and a metal socket carried by said socket holder and extending away therefrom and spaced in radially from the walls of said housing to provide free ventilation therearound, air passing up in through said open bottom end around said socket and socket holder to and out through said ventilating apertures.

13. The assembly of claim 12 having additionally an outer shade having an upper and inner periphery above and axially inwardly of said bottom end of said housing and extending radially outwardly and axially downwardly beyond and below said housing and being at all points spaced away a substantial distance from said housing; and means attaching said outer shade to said housing and for providing ventilation between them for the full peripheral and axial extent of said outer shade, so that cooling air flows up into said outer shade and through it around said housing.

14. The assembly of claim 12 wherein said end wall is provided with downwardly extending projections that are the only portions of said end wall secured to said socket holder and serve to space said socket holder down from most of said end wall for improved ventilation of said socket holder and socket.

15. A lamp assembly, including in combination: a light-globe socket; a socket holder of sturdy insulating plastic secured to said socket; a one-piece shell of sturdy insulating plastic having a sleeve-like portion with an upper end wall having a plurality of downwardly extending projections secured to the upper end of said socket holder and spacing said socket holder down from the remainder of said end wall, said end wall also having a central axial cord opening, said shell also having an outwardly-flared inner shade at its lower end and a plurality of vent openings arranged around and spaced from said central opening; an outer shade surrounding the lower portion of said inner shade and spaced away from said shell at all points and having a flexible plastic body with an inner and upper portion around and spaced radially out from said shell above said inner shade and having a smaller radius than the widest part of said inner shade and a bowl extending axially below and radially outwardly beyond said inner shade; and ventilating and securing means joining said outer shade to said shell while affording ventilating passage means between them lying at all points outside said shell and extending for the full height of said outer shade.

16. The lamp assembly of claim 15 wherein said shell end wall has an upwardly projecting annular portion radially inside said vent openings, and there is a drip shield of sturdy insulating plastic secured to and bearing against said projecting annular portion, said drip shield having a circumferential lip overlying said end wall and curved down below said end wall at a spaced distance therebetween to protect the interior of said lamp by preventing water from dripping down through said vent openings, said lip not interfering with the venting function of said openings, said drip shield also having projections with lashing openings therethrough, enabling the attachment of said lamp assembly to suitable rope for support of said lamp by said drip shield.

17. The lamp assembly of claim 15 having a globe-protecting wire cage secured to the rim of said inner shade and extending axially beyond the bowl of said outer shade.

References Cited in the file of this patent

UNITED STATES PATENTS

| 2,056,511 | Fenzl | Oct. 5, 1936 |
| 2,164,527 | Knapp | July 4, 1939 |
| 2,322,945 | Liabastie | June 29, 1943 |
| 2,652,482 | Bissell | Sept. 15, 1953 |
| 2,853,597 | Hartman | Sept. 23, 1958 |
| 2,866,084 | Lester | Dec. 23, 1958 |

OTHER REFERENCES

Novalux Street Lighting Units, General Electric Co., Form 6 Novalux Pendent Units, pages 34, 35, and 36, figures 14, 15, and 16, March 15, 1916. (Copy in Div. 53.)